(12) United States Patent
Nicolini et al.

(10) Patent No.: US 10,989,693 B2
(45) Date of Patent: *Apr. 27, 2021

(54) PIPE INSPECTION

(71) Applicant: Tenaris Connections B.V., Amsterdam (NL)

(72) Inventors: Alberto Nicolini, Dalmine (IT); Javier Etcheverry, Dalmine (IT); Fernando Núñez, Buenos Aires (AR)

(73) Assignee: Tenaris Connections B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/646,553

(22) PCT Filed: Sep. 11, 2018

(86) PCT No.: PCT/EP2018/074456
§ 371 (c)(1),
(2) Date: Mar. 11, 2020

(87) PCT Pub. No.: WO2019/053005
PCT Pub. Date: Mar. 21, 2019

(65) Prior Publication Data
US 2020/0371066 A1    Nov. 26, 2020

Related U.S. Application Data

(63) Continuation of application No. 15/702,389, filed on Sep. 12, 2017, now Pat. No. 10,712,314.

(51) Int. Cl.
*G01N 27/82* (2006.01)
*B65G 43/08* (2006.01)
(Continued)

(52) U.S. Cl.
CPC .............. *G01N 27/82* (2013.01); *G01N 27/83* (2013.01); *B65G 43/08* (2013.01); *B65G 47/642* (2013.01);
(Continued)

(58) Field of Classification Search
CPC ........ G01N 27/82; G01N 27/83; B65G 43/08; B65G 47/642; B65G 49/00;
(Continued)

(56) References Cited

U.S. PATENT DOCUMENTS 7,263,887 B2    9/2007  Sfeir et al.
7,310,890 B2   12/2007  Cattaneo et al.
(Continued)

FOREIGN PATENT DOCUMENTS

CN    103995049    8/2014
CN    104777220    7/2015
(Continued)

OTHER PUBLICATIONS

'cisco-eagle.com' [online]. "Accumulation Conveyor," Published on or before Sep. 1, 2017, [retrieved on Jan. 24, 2019], retrieved from the Internet: URL:<http://www.cisco-eagle.com/catalog/c-3206-accumulation-conveyor.aspx>. 5 Pages.
(Continued)

*Primary Examiner* — Melissa J Koval
*Assistant Examiner* — Trung Nguyen
(74) *Attorney, Agent, or Firm* — Fish & Richardson P.C.

(57) ABSTRACT

The subject matter of this specification can be embodied in, among other things, a method that includes providing a first pipe having a first leading end and a first trailing end, providing a second pipe having a second leading end and a second trailing end, abutting at least a portion of the second leading end to at least a portion of the first trailing end to define a pipe abutment zone comprising a portion of the first pipe measured longitudinally from the first trailing end and a portion of the second pipe measured longitudinally from the second leading end, conveying the first and second pipe past an inspection device, inspecting by the inspection device a first portion of the pipe abutment zone and a second
(Continued)

portion of the pipe abutment zone, and providing defect data that describes defects detected within the first portion and the second portion.

23 Claims, 9 Drawing Sheets

(51) Int. Cl.
*G01N 27/83* (2006.01)
*B65G 47/64* (2006.01)
*B65G 49/00* (2006.01)

(52) U.S. Cl.
CPC ...... *B65G 49/00* (2013.01); *B65G 2201/0276* (2013.01); *B65G 2203/0208* (2013.01)

(58) Field of Classification Search
CPC .... B65G 2201/0276; B65G 2203/0208; G06F 19/00; B05B 15/00
USPC ....... 324/200, 228, 220, 221, 338–371, 323, 324/207.13–247, 500, 529, 530, 160, 324/177–179, 329, 637
See application file for complete search history.

(56) References Cited

U.S. PATENT DOCUMENTS

| | | |
|---|---|---|
| 7,401,518 B2 | 7/2008 | Sfeir et al. |
| 7,552,640 B2 | 6/2009 | Sfeir et al. |
| 7,997,138 B2 | 8/2011 | Sfeir et al. |
| 2004/0112713 A1 | 6/2004 | Haan et al. |
| 2011/0257903 A1* | 10/2011 | Imbert ................ G01N 29/275 702/35 |
| 2017/0160236 A1 | 6/2017 | Uhlig et al. |
| 2019/0079052 A1 | 3/2019 | Nicolini et al. |

FOREIGN PATENT DOCUMENTS

| | | |
|---|---|---|
| DE | 102012202800 | 8/2013 |
| DE | 102013209774 | 11/2014 |
| JP | H0921787 | 1/1997 |

OTHER PUBLICATIONS

'cisco-eagle.com' [online]. "Pipe Handling Conveyors," Published on or before Sep. 1, 2017, [retrieved on Jan. 24, 2019], retrieved from the Internet: URL:<http://www.cisco-eagle.com/catalog/c-3278-pipe-handling-conveyor.aspx>. 7 pages.

International Preliminary Report on Patentability in International Application No. PCT/EP2018/074456, dated Dec. 18, 2019, 21 pages.

International Search Report and Written Opinion in International Application No. PCT/EP2018/074456, dated Dec. 13, 2018, 19 pages.

interroll.us [online]. "RollerDrive," Published on or before Sep. 1, 2017, [retrieved on Jan. 24, 2019], retrieved from the Internet: URL:<https://www.interroll.us/products/drives-and-controls/rollerdrive/>. 4 pages.

* cited by examiner

PIPE INSPECTION

CLAIM OF PRIORITY

This application claims priority to U.S. patent application Ser. No. 15/702,389 filed on Sep. 12, 2017, the entire contents of which are hereby incorporated by reference.

TECHNICAL FIELD

This instant specification relates generally to non-destructive testing of pipe sections and more particularly electromagnetic inspection of abutment zones of adjacent pipe sections.

BACKGROUND

Electromagnetic type testing is used to analyze defects in tubes and pipes. Such testing is used for inspection during manufacturing (e.g., quality control) and/or during receiving by a company or consumer (e.g., incoming inspection). This type of testing has relatively high sensitivity, can be automated, can enable automatic classification of the inspected pipe (e.g., accept/reject, pass/fail, good/bad), and increase throughput.

Electromagnetic type testing allows inspection of the walls of the pipe to detect and locate defects, either internal or external, by contacting electromagnetic probes with the object under testing. This testing is standardized in many countries, and the requirements for such testing are listed by the standards provided by the American Petroleum Institute (API) (USA), Deutsches Institut für Normung (DIN) (Germany), and Gosudarstvennyy Standart (GOST) (Russia). Basic standard parameters are described by the international standard ISO9402.

A number of companies manufacture a variety of instruments applicable to Electromagnetic testing, such as the Dr. Foerster Institute of Germany with its defect detectors "Rotomat/Transomat", the defect detector "Amalog/Sonoscope" from the company "Tuboscope/National Oilwell Varco", USA, and the defect detector VMD-30N from MSIA, Russia among others.

SUMMARY

In general, this document describes non-destructive testing of pipe sections and more particularly electromagnetic inspection of abutment zones of adjacent pipe sections.

In a first aspect, a method of pipe inspection includes providing a first pipe section having a first pipe body, a first leading end, and a first trailing end, providing a second pipe section having a second pipe body, a second leading end, and a second trailing end, abutting at least a portion of the second leading end to at least a portion of the first trailing end to define a pipe abutment zone comprising a portion of the first pipe section measured longitudinally from the first trailing end a longitudinal distance of 300 mm and a portion of the second pipe section measured longitudinally from the second leading end a longitudinal distance of 300 mm, conveying the first pipe section and the second pipe section longitudinally at a first speed relative to an inspection device configured to perform an electromagnetic inspection, inspecting, by the inspection device as the first pipe section and the second pipe section are conveyed relative to the inspection device, a first portion of the pipe abutment zone and a second portion of the pipe abutment zone, and providing, based on the inspecting, defect data that describes defects detected within at least one of the first portion and the second portion of the pipe abutment zone by the inspection device.

Various implementations include some, all, or none of the following features. Abutting the second leading end to the first trailing end to define a pipe abutment zone can include conveying the first pipe section longitudinally at the first speed, conveying the second pipe section longitudinally at a second speed that is faster than the first speed, contacting the second leading end to the first trailing end to define the pipe abutment zone, and conveying the first pipe section and the second pipe section longitudinally such that contact between the first trailing end and the second leading end is maintained. The method can include conveying, after inspecting the pipe abutment zone, the first pipe section longitudinally at a third speed that is faster than the second speed. The method can include providing a third pipe section having a third pipe body, a third leading end, and a third trailing end, abutting at least a portion the third leading end to at least a portion of the second trailing end to define a second pipe abutment zone comprising a portion of the second pipe section measured longitudinally from the second trailing end a longitudinal distance of 300 mm and a portion of the third pipe section measured longitudinally from the third leading end a longitudinal distance of 300 mm, conveying the second pipe section and the third pipe section longitudinally at the first speed relative to the inspection device, inspecting, by the inspection device as the second pipe section and the third pipe section are conveyed relative to the inspection device, the second pipe abutment zone, and providing, based on the inspecting, defect data that describes defects detected within the second pipe abutment zone by the inspection device. The method can include inspecting, by the inspection device as the first pipe section is conveyed relative to the inspection device, a portion of the first pipe body, and inspecting, by the inspection device as the second pipe section is conveyed relative to the inspection device, a portion of the second pipe body. The inspection can include creating a magnetic field proximal an axial pipe section, detecting an interaction of the magnetic field with the axial pipe section, and detecting a variance of the interaction at the axial pipe section. The method can include determining that the variance exceeds a predetermined defect threshold value, identifying one of the first pipe section or the second pipe section as having the axial pipe section that caused the variance as a defective pipe section, and segregating the defective pipe section from other pipe sections not identified as defective pipe sections, and wherein the axial pipe section is less than 300 mm away from the first trailing end or the second leading end. The method can include determining that the variance exceeds a predetermined defect threshold value, receiving position information of at least one of the first pipe section and the second pipe section, identifying one of the first pipe section or the second pipe section as having the axial pipe section that caused the variance as a defective pipe section, and identifying, based on the position information, an identified position of the axial pipe section along the defective pipe section, and providing defect information that identifies the defective pipe section and the identified position of the axial pipe section where the variance exceeded the predetermined defect threshold value, wherein the identified position is in the pipe abutment zone of the first pipe section and the second pipe section. The method can also include receiving position information of the first pipe section and the second pipe section, determining that the variance exceeds a predetermined abutment threshold value, identifying, based on the position information, an identified position of the axial pipe section where the variance exceeded the predetermined abutment threshold value, providing the identified position as first position information representative of a location of the first trailing end, and providing the identified position as second position information representative of a location of the second leading end. The method can also include receiving, by a controller, at least one of the first position information and the second position information, and controlling, by the controller and after inspecting the pipe abutment zone, a process based at least one of the first position information and the second position information. The process can be one of a motion control process, a longitudinal electromagnetic longitudinal defect inspection process, an ultrasonic pipe thickness inspection process, a transversal defect inspection process, or a machine vision based inspection process. Inspecting the first portion of the pipe abutment zone can include inspecting a portion of the first pipe section measured longitudinally from the first trailing end a longitudinal distance of 3 mm to 300 mm and inspecting the second portion of the abutment zone comprises inspecting a portion of the second pipe section measured longitudinally from the second leading end a longitudinal distance of 3 mm to 300 mm.

In a second aspect, a computer program stored in a computer readable storage device includes instructions that when executed by a user device cause the user device to perform electromagnetic inspection operations on a first pipe section having a first pipe body, a first leading end, and a first trailing end and a second pipe section in at least partial abutment with a second pipe body having a second leading end, and a second trailing end, said inspection operations including receiving pipe defect signals from an electromagnetic pipe inspection device, receiving pipe position signals from a pipe position location device, detecting a pipe defect location in an abutment zone comprising a portion of the first pipe section measured longitudinally from the first trailing end a longitudinal distance of 300 mm and a portion of the second pipe section measured longitudinally from the second leading end a longitudinal distance of 300 mm, based on the received pipe defect signals, received pipe position signals, and a predetermined pipe defect threshold value, identifying a defective pipe section based on the pipe defect location, and providing an identity of the defective pipe section.

Various implementations can include some, all, or none of the following features. The operations can include detecting a pipe abutment location based on received pipe defect signals, received pipe position signals, and a predetermined pipe abutment threshold value that is different from the predetermined pipe defect threshold value, and providing a pipe end position signal based on the pipe abutment location, representative of a location of an abutment between a pipe section leading end and a pipe section trailing end. The operations can include providing a conveyor control signal that causes a first section of pipe conveyor to operate at a first speed, and providing a conveyor signal that causes a second section of pipe conveyor, operationally downstream from the first section of pipe conveyor, to operate at a second speed that is slower than the first speed, wherein the pipe inspection device is arranged along the second section of pipe conveyor. The operations can include determining, based on pipe position signals, that a first pipe section on the first section of pipe conveyor has abutted a second pipe section on the second section of pipe conveyor, and providing a second conveyor control signal that causes the first section of pipe conveyor to operate at approximately the second speed. Detecting a pipe defect location based on received pipe defect signals, received pipe position signals, and the predetermined defect threshold value can include receiving position information of at least one of a first pipe section having a trailing end and a second pipe section having a leading end longitudinally abutting the trailing end, and determining that a variance in the pipe defect signals exceeds the predetermined pipe defect threshold value, wherein the variance is detected less than 300 mm away from the first trailing end or the second leading end, and wherein identifying a defective pipe section based on the pipe defect location further comprises identifying one of the first pipe section or the second pipe section as having caused the variance. Detecting a pipe abutment location can include receiving position information of at least one of a first pipe section having a trailing end and a second pipe section having a leading end longitudinally at least partially abutting the trailing end, determining that a variance in the pipe defect signals exceeds a predetermined pipe abutment threshold value, wherein the variance is detected less than about 3 mm away from the first trailing end or the second leading end, and identifying, based on the position information, an identifying position where the variance exceeded the predetermined abutment threshold value, and wherein providing the pipe end position signal further comprises providing the identified position as a pipe end position.

In a third aspect, a system for pipe inspection includes an electromagnetic pipe inspection device, a pipe position location device, and a controller having a defect signal input port configured to receive pipe defect signals from the pipe inspection device, a position input port configured to receive pipe position signals from the pipe position location device, and a processor configured to detect a pipe defect location based on pipe defect signals, pipe position signals, and a predetermined pipe defect threshold value, and provide the pipe defect location as a pipe defect location signal at a first output port, wherein the pipe defect location signal identifies pipe sections having pipe defects, wherein the pipe defect location is within an abutment zone comprising a portion of a first pipe section measured longitudinally from a first trailing end a longitudinal distance of 300 mm, and a second pipe section measured longitudinally from a second leading end, at least partially abutted to the first trailing end, a longitudinal distance of 300 mm.

Various embodiments can include some, all, or none of the following features. The processor can be configured to detect a pipe abutment location based on pipe defect signals, pipe position signals, and a predetermined pipe abutment threshold, and provide a pipe end position signal at a second output port, wherein the pipe end position signal identifies a location of at least one of a pipe section leading end and a pipe section trailing end. The system can include a conveyor configured to convey pipe sections longitudinally, the conveyor comprising first motor configured to convey pipe sections along an upstream section of the conveyor a first speed, and a second motor configured to convey pipe sections along a downstream section of the conveyor at a second speed that is slower than the first speed. At least one of the first motor and the second motor can be configured to convey pipe sections based on a speed signal received from a motor control output port of the controller, and wherein the processor can be further configured to provide the speed signal such that the second speed is less than the first speed. The conveyor can include a third motor configured to convey pipe sections along an output section of the conveyor at a third speed that is faster than the second speed.

The systems and techniques described here may provide one or more of the following advantages. First, a system can improve the capabilities of existing pipe inspection devices. Second, the system can transform a discrete or batch inspection process into one that emulates a continuous process. Third, the system can increase the service lifetime of pipe inspection devices by reducing wear. Fourth, the system can increase the efficiency of pipe inspection processes by enabling automated inspection processes to inspect relatively greater portions of pipe sections than has been done previously.

The details of one or more implementations are set forth in the accompanying drawings and the description below. Other features and advantages will be apparent from the description and drawings, and from the claims.

DETAILED DESCRIPTION

This document describes systems and techniques for performing non-destructive testing of pipe sections. In general, the capabilities of existing electromagnetic type pipe inspection systems are limited in their ability to inspect near the ends of discrete pipe sections. As will be explained below, the ability of these systems to inspect near the ends of pipes can be improved by arranging two or more discrete pipe sections such that the pipe sections are in end-to-end contact during inspection.

Figure 1A:
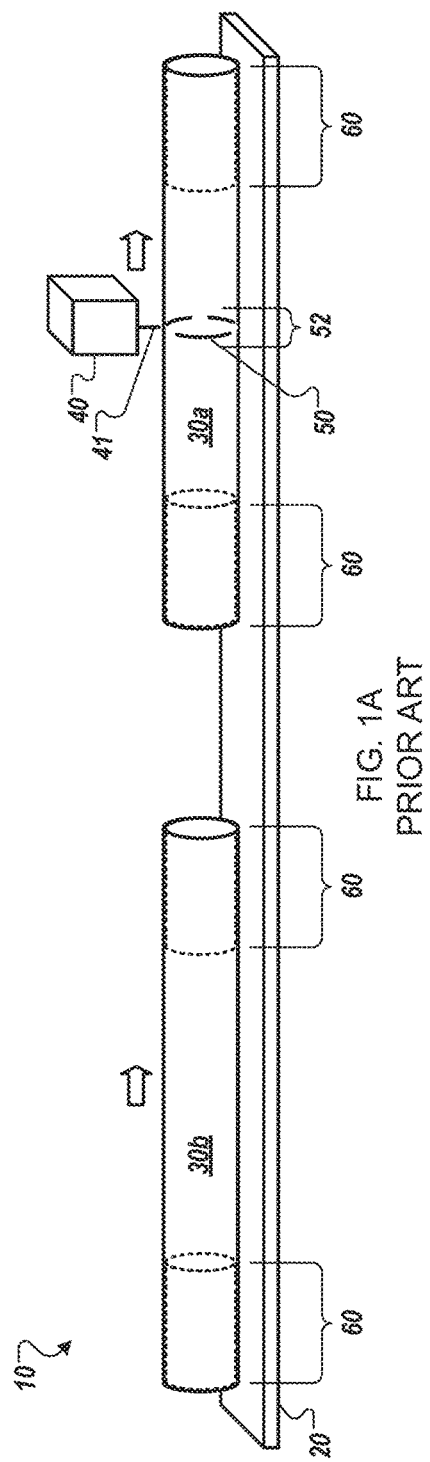
FIG. 1A is an elevated view of an example of a prior art pipe inspection system with blind zones proximal to the ends of the pipe being inspected.

FIG. 1A is an elevated view of an example of a prior art pipe inspection system 10.

In the pipe inspection system 10, a conveyor 20 moves a first pipe section 30a and a second pipe section 30b past an inspection device 40 (e.g., a magnetic-type non-destructive testing device). The inspection device 40 is configured to inspect an axial section 50 of the pipe sections 30a and 30b as they pass through an inspection zone 52. Pipe sections such as the pipe sections 30a and 30b have lengths of about 6 m to 15 m or more in length, and have diameters ranging from about 50 mm to 300 mm, or more specifically, from 114 mm to 244 mm.

In some embodiments, the inspection device 40 can detect internal and external defects in pipe sections using the principle of dispersed electromagnetic flow (e.g., electromagnetic inspection). By means of an adjustable DC current, the pipe section 30a is magnetized to its longitudinal axis. Transversal Defects or discontinuities in the pipe section 30a generate disperse electromagnetic flows. A sensor probe 41 contacts the pipe, and an induction coil housed in the sensor probe 41 detects these flows. The signals captured by the probe 41 are processed and analyzed to determine the type of defect.

In some embodiments, the inspection device 40 can be a rotating non-destructive testing device that utilizes electromagnetic principles to detect the presence of longitudinal discontinuities in pipe sections. Such examples also use the disperse flow principle. For example, the pipe section 30a can be magnetized transversely to its axis by an alternating magnetic field. The penetration is very low since it is concentrated around the circumference of the pipe due to the skin effect, in which the outer and inner surfaces are magnetically saturated. Such magnetization occurs without contact with the pipe section 30a by means of two alternating field yokes, which are assembled together with the detection coils on the arms. The assembly is mounted on a rotating head and rotates about the pipe to perform the inspection. Discontinuities and defects on the tube create a disperse flow, and this flow can be captured by the detection coils, and turned into signals that are processed and analyzed to identify the nature of the defect.

Such inspection devices, when used to inspect pipe sections have blind zones 60 (e.g., dead zones) at end portions of the pipe sections where the pipes cannot be accurately inspected. In some cases, for inspection devices configured to inspect pipe sections having lengths of 6 m to 15 m or more and/or diameters ranging from about 50 mm to 300 mm, the blind zones 60 can be about 300 mm to 500 mm long at each end of a pipe section.

Figure 1B:
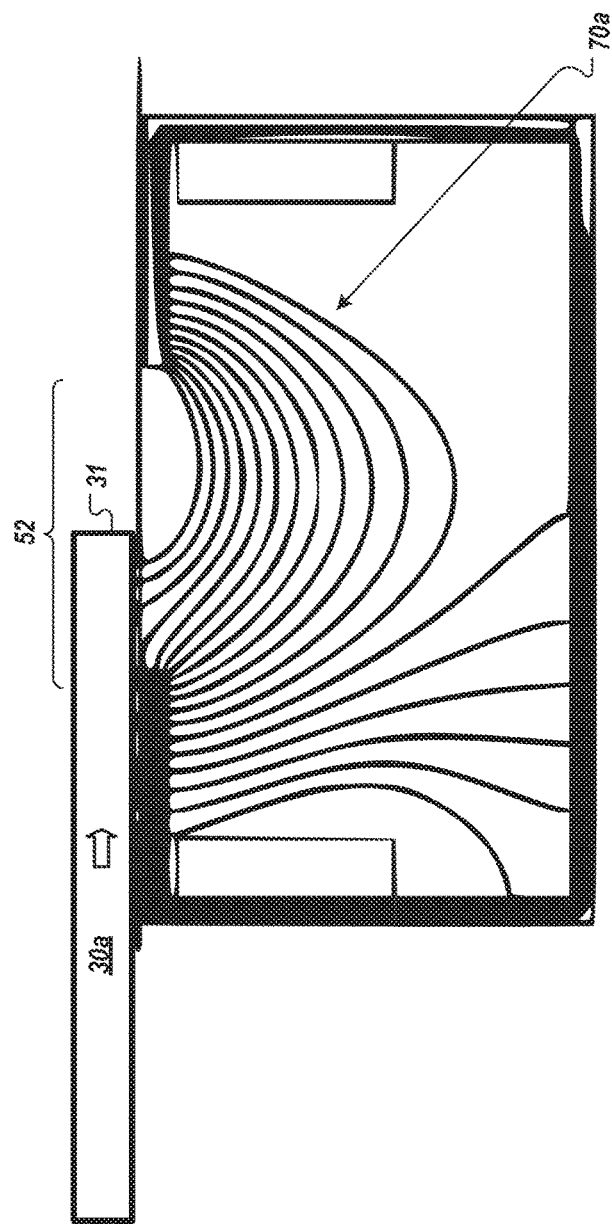
FIG. 1B is a conceptual side view of example magnetic flux in a prior art pipe inspection system.

The blind zone phenomenon is caused by the inability of the equipment to ensure a stable magnetic field in the zone and correct contact of the probes on the pipe body. FIG. 1B is a conceptual side view of example magnetic flux in the pipe inspection system 10. In the illustrated example, the pipe section 30a is shown with an end 31 entering the inspection zone 52. A magnetic field 70a is formed proximal to the inspection zone 52 as part of the inspection process, and the metal content of the pipe section 30a interacts with the magnetic field 70a. The end 31 however, causes instability in the magnetic field 70a, which can cause readings from the inspection device 40 to be unreliable or unusable near the end 31, creating the blind zone 60. In other examples, the probe(s) of the inspection device 40 can be open before the pipe section 30a enters. The pipe section 30a can enter the inspection device at high speed, but just as the probe 41 makes contact with the surface of the pipe section, the blind zone 60 at the leading end of the pipe section has already passed the probe 41 and as such the section of pipe in the blind zone 60 may not get inspected. In other examples, the probe 41 may be initially positioned away from contact or proximity with the pipe section 30a (e.g., to prevent longitudinal collision with the leading end of the pipe section 30a) and may then be brought into contact or proximity with the pipe section 30a after the leading end has passed. However, some time is required to reposition the probe 41, which allows a length of the pipe section 30a to pass (e.g., the blind zone 60) before sensing can begin. In yet another example, the probe 41 may be constructed to endure a collision with the leading end of the pipe section 30a, however such collisions can cause the probe 41 to bounce and/or vibrate (e.g., oscillate). The sensing ability of the probe 41 is diminished until these vibrations dampen out, and the amount of time needed for such damping can allow the blind zone 60 to pass.

Figure 2A:
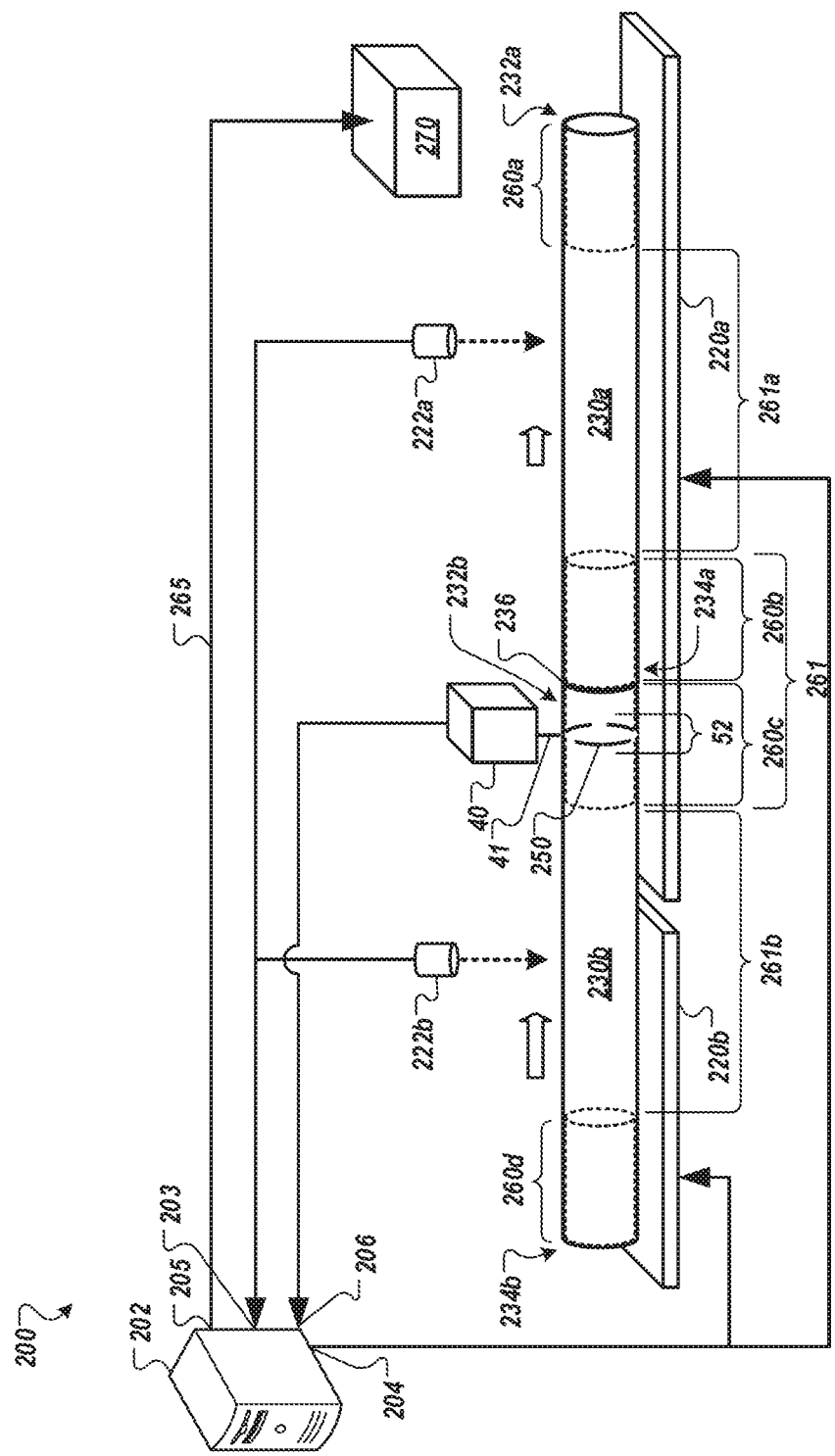
FIG. 2A is an elevated view of an example pipe inspection system with abutted pipe sections.

FIG. 2A is an elevated view of an example pipe inspection system 200 with abutted pipe sections. In the pipe inspection system 200, a conveyor 220a moves a first pipe section 230a, and a conveyor 220b moves a second pipe section 230b past the inspection device 40 (e.g., an electromagnetic-type non-destructive testing device). The pipe section 230a has a pipe body 261a extending between a leading end 232a and a trailing end 234a. A blind zone 260a extends longitudinally inward from the leading end 232a, and a blind zone 260b extends longitudinally inward from the trailing end 234a. The pipe section 230b has a pipe body 261a extending between a leading end 232b and a trailing end 234b. A blind zone 260c extends longitudinally inward from the leading end 232b, and a blind zone 260d extends longitudinally inward from the trailing end 234b.

The inspection device 40 is configured to inspect an axial section 250 of the pipe sections 230a and 230b as they pass through an inspection zone 252. A pipe position location device 222a (e.g., an encoder, a break-beam detector, a proximity sensor) is configured to sense the position of pipe sections as they exit the inspection zone 252, and a pipe position location device 222b is configured to sense the position of pipe sections as they enter the inspection zone 252. Pipe sections such as the pipe sections 230a and 230b have lengths of about 6 m to 15 m or more in length, and have diameters ranging from about 50 mm to 300 mm, or more specifically, from about 114 mm to 244 mm.

A controller 202 includes input ports 203 configured to receive signals from the pipe location devices 222a and 222b, and provide conveyor control signals at output ports 204 configured for communication with the conveyors 220a and 220b. The controller 202 can control the speed of the conveyor 220a independently from the speed of the conveyor 220b.

The conveyor 220a is controlled to convey pipe sections at a speed that is relatively slower than that of the conveyor 220b. As such, in the illustrated example, the pipe section 230a is conveyed longitudinally at a slower speed than the pipe section 230b. The pipe section 230b has caught up to the pipe section 230a, and the leading end 232b is abutted against (e.g., physically contacts at least a portion of) the trailing end 234a to define an abutment 236. The process of abutting pipe sections will be discussed further in the descriptions of FIGS. 3A-3E.

With the pipe sections 230a and 230b abutted together, the blind zones 260b and 260c define an abutment zone 261. The inspection device 40 can accurately inspect the pipe sections 230a and 230b within the abutment zone 261. In some embodiments, for individual pipe sections having lengths of about 6 m to 15 m or more and/or diameters ranging from about 50 mm to 300 mm, or more specifically, from about 114 mm to 244 mm, the blind zones 260b and 260c can be reduced from a range of about 300 mm to 500 mm inward from the trailing end 232a and the leading end 234b (e.g., as in FIGS. 1A-1B), down to about 3 mm on each side of the abutment 236 for abutted pipe sections.

Figure 2B:
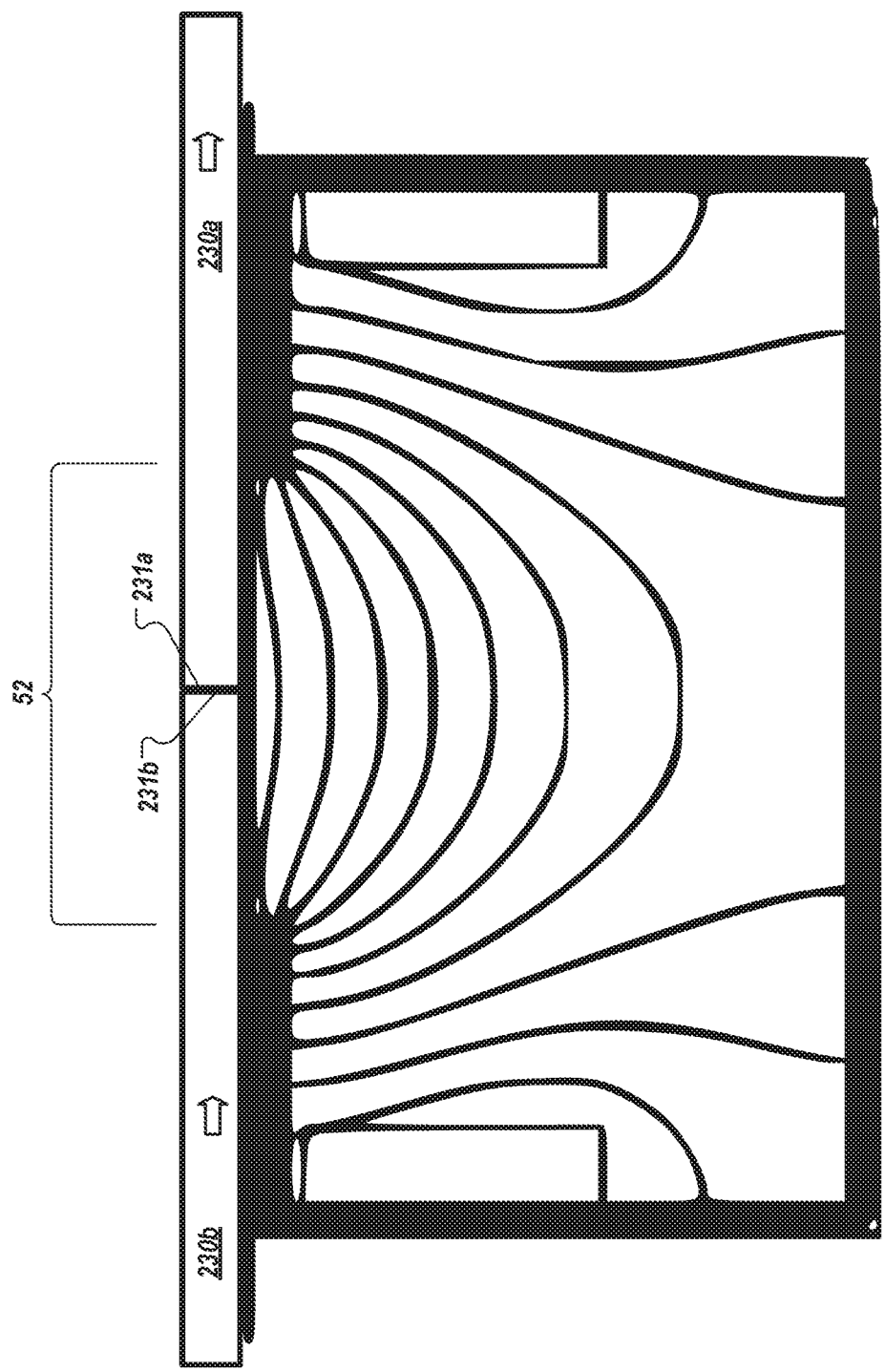
FIG. 2B is a conceptual side view of example magnetic flux in an example pipe inspection system with abutted pipe sections.

This improved performance of down to about 3 mm is attributable to the abutment 236 for reasons that can depend on the configuration of the inspection device 40 and the sensor probe 41. FIG. 2B is a conceptual side view of example magnetic flux in the pipe inspection system 200. In the illustrated example, the pipe sections 230a is shown with an end 231a abutting the pipe section 230bb at an end 231b in the inspection zone 52. A magnetic field 70b is formed proximal to the inspection zone 52 as part of the inspection process, and the metal content of the pipe sections 230a and 230b interacts with the magnetic field 70b. Since the ends 231a and 231b are abutted, magnetic flux can pass between the pipe sections 230a and 230b with greater stability (e.g., compared to the unabutted end 31 of FIG. 1B). The additional stability in the magnetic field 70b improves the ability of the inspection device 40 to provide more reliable, accurate, and/or usable measurements near the ends 231a and 231b, thus shrinking the blind zones 60 or allowing for inspection within a larger portion of the blind zones 60. For example, with the pipe sections 230a and 230b in end-to-end abutted contact, the magnetic field in the area (generated by the machine) is stable and with the same characteristics than the magnetic field at the pipe body, also with the pipe sections 230a and 230b in end-to-end abutted contact, the leading end 232b does not physically present a blunt leading edge that can collide with the probe 41. As such, the probe 41 does not need to be retracted from the pipe section 230a (e.g., thus creating a portion of the blind zone 260b) and repositioned upon the pipe section 230b (e.g., thus creating a portion of the blind zone 260c). In other examples in which the probe 41 is configured collide with pipe ends, the amount of vibration, bouncing, or oscillation of the probe caused by any discontinuities at the abutment 236 is relatively less than those caused by, for example, a full-on collision with the leading end 232b. As such, the amount of time needed to dampen the oscillations and restore accurate inspection capability of the inspection device 40 is reduced, thus reducing the amount of longitudinal length of the pipe sections 230a and 230b that cannot be inspected near the trailing end 234a and the leading end 232b.

The inspection device 40 provides sensor signals that are representative of the quality of the pipe section 230b at the axial section 250. The sensors signals vary with the quality of the pipe sections 230a, 230b. E.g., "normal" or "acceptable" axial sections 250 can be represented by a first signal level, while axial sections 250 having defects (e.g., distortions, voids, inclusions, bubbles, cracks) can result in relatively higher or lower signal levels. The sensor signals are received by the controller 202 at a sensor input port 206, and are processed to identify defects and other deformities in the pipe sections 230a, 230b. The controller 202 compares the received sensor signals against a predetermined defect threshold value (e.g., a calibration value provided by a user) to identify that a pipe section includes a defect of some type. For example, the inspection device 40 may provide a range of zero to 10 v as sensor signals that vary with the quality of the axial section 250, in which a 5 v output is considered nominal. A +/−1 v threshold window may be provided by an operator, in which signals that go outside the window (e.g., cause the signal to be less than 4 v or greater than 6 v) may be determined to be representative of a flaw.

The inspection device 40 also provides sensor signals that are representative of the abutment 236 at the axial section 250. The sensors signals vary due to the discontinuity between the abutted pipe sections 230a, 230b. E.g., "normal" or "acceptable" axial sections 250 can be represented by a first signal level, defects can be represented by a second signal level, and abutments can cause signal levels that appear as a significantly larger defect having a relatively larger third signal level. The controller 202 compares the received sensor signals against a predetermined abutment threshold value (e.g., a calibration value provided by a user) to identify when the abutment 236 is in the inspection zone 52. For example, the inspection device 40 may provide a range of zero to 10 v as sensor signals that vary with the quality of the axial section 250, in which a 5 v output is considered nominal. A +/−1 v threshold window may be provided by an operator, in which signals that go outside the window (e.g., less than 4 v or greater than 6 v) may be determined to be representative of a flaw. However, it may be known beforehand that true flaws generally do not cause the sensor signal to vary by more than +/−3 v (e.g., cause the signal to be less than 2 v or greater than 8 v). As such, sensor signals that exceed the abutment threshold value may be determined to be representative of the abutment 236 rather than a flaw. In some implementations, signals caused by abutments can be dismissed and the corresponding pipe section can be prevented from being identified as including a flaw.

The controller 202 can process pipe location signals from the pipe location devices 222a and/or 222b and the sensor signals from the inspection device 40 to identify the locations of the pipe sections 230a, 230b, the abutment 236, and/or detected flaws. For example, the controller 202 can be configured to identify the pipe section in which a flaw was detected. In another example, the controller 202 can identify the pipe section and the longitudinal location along that pipe section at which a flaw was detected. In another example, the controller 202 can identify the locations of the leading ends 232a, 232b and/or trailing ends 234a, 234b based on identified abutments 236 to determine the lengths and/or conveyor positions of the pipe sections 230a, 230b.

The controller 202 provides a downstream control signal 265 at an output port 205. The downstream control signal 265 is received by a downstream controller 270 (e.g., programmable logic controller) configured to control subsequent operations. For example, the downstream control signal 265 can identify the longitudinal locations of pipe flaws within the pipe sections 230a, 230b (e.g., flaws near the leading ends 232a, 232b and trailing ends 234a, 234b may simply be cut off, resulting in a slightly shorter pipe section not having the offending flaw). In another example, the downstream control signal 265 can identify the conveyor positions and/or lengths of the pipe sections 230a, 230b (e.g., position-dependent downstream operations may be coordinated based on the determined lengths and/or positions of the pipe sections). In another example, the downstream control signal 265 can identify the pass/fail status of the pipe sections 230a, 230b with respect to pipe flaws, and the downstream controller 270 can respond by causing flawed pipe sections to be segregated or otherwise differentiated (e.g., sent for rework, recycling, or disposal) from pipe sections that have not been identified as being flawed. An example of such segregation will be discussed in the descriptions of FIGS. 5A and 5B.

FIGS. 3A-3E are block diagrams of an example pipe inspection system 300 and pipe sections at various stages of inspection. In some embodiments, the pipe inspection system 300 can be the example pipe inspection system 200 of FIG. 2A.

Figure 3A:
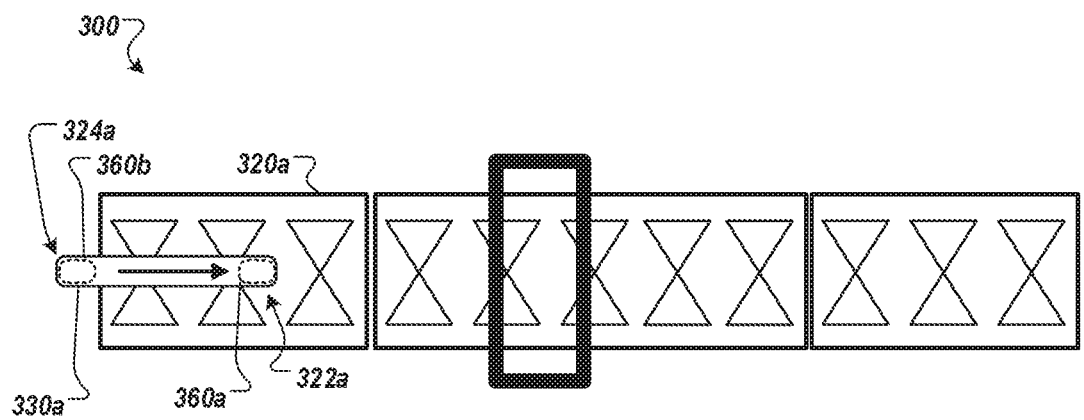
FIGS. 3A-3E are block diagrams of an example pipe inspection system and pipe sections at various stages of inspection.

Referring to FIG. 3A, a pipe section 330a is conveyed longitudinally by a conveyor section 320a at a first speed. The conveyor section 320a includes one or more motors that can be controlled to control the speed at which pipe sections are transported. Individually, the pipe section 330a includes a blind zone 360a at a leading end 322a and a blind zone 260b at a trailing end 324a.

Figure 3B:
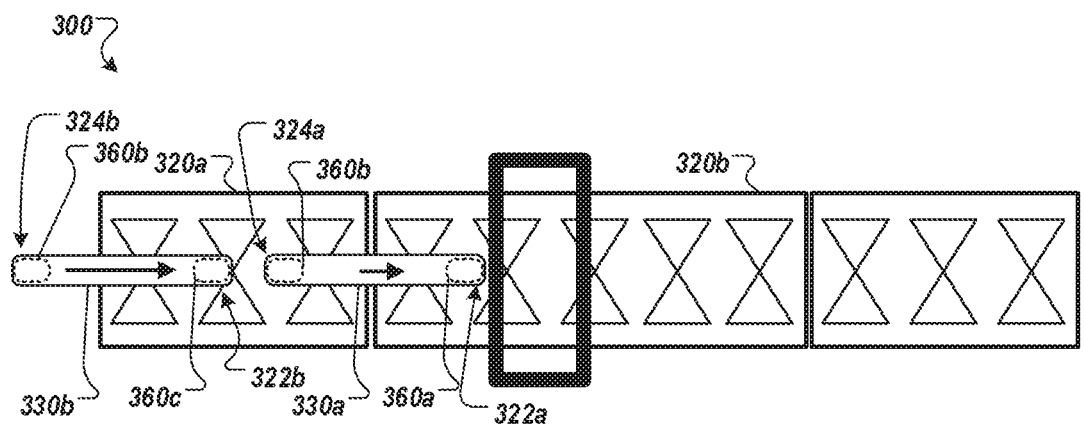

Referring now to FIG. 3B, the pipe section 330a has been conveyed to a conveyor section 320b at the first speed. A pipe section 330b is placed on the conveyor section 320a, behind the pipe section 330a, for transport at the first speed. The conveyor section 320b includes one or more motors that can be controlled to control the speed at which pipe sections are transported. The conveyor section 320b is configured to transport pipe sections at a second speed that is relatively slower than the speed of the conveyor 320a. Individually, each of the pipe sections 330a and 330b includes a blind zone 360 at a leading end 322a and at a trailing end 324a. For individual pipe sections having lengths of about 6 m to 15 m or more and/or diameters ranging from about 50 mm to 300 mm, the blind zones 360 can be about 300 mm to 500 mm long at the ends of their respective pipe sections.

Figure 3C:
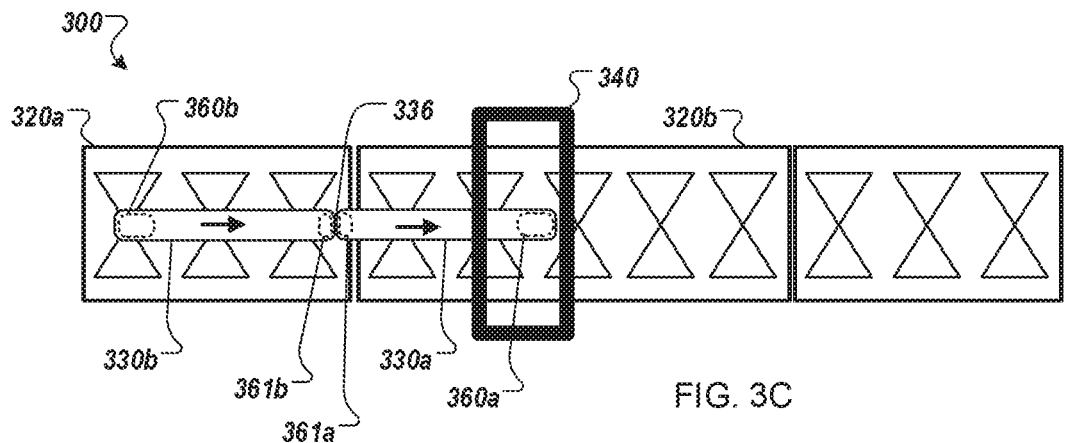

Referring to FIG. 3C, since the pipe section 330a is moving more slowly than the pipe section 330b, the pipe section 330b will catch up to the slower-moving pipe section 330a and abut the pipe section 330b at an abutment 336. Since the pipe section 330a and the pipe section 330b are in contact, the blind zones 360b and 360c will shrink lengthwise (e.g., from about 300 mm to about 3 mm) to become a blind zone portion 361a and a blind zone portion 361b.

Figure 3D:
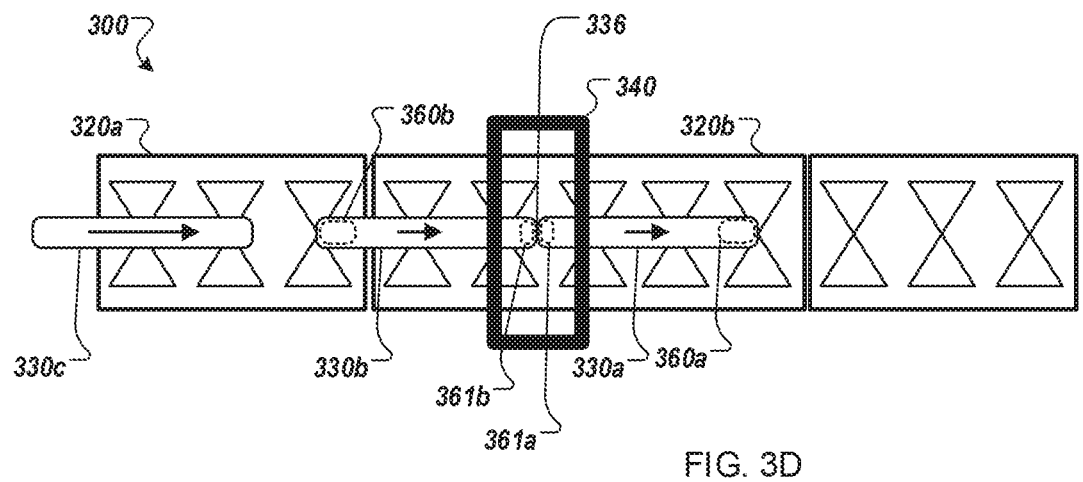

Referring to FIG. 3D, the abutted pair of pipe sections 330a and 330b then advance at the slower speed through an inspection device 340. The inspection device 340 inspects the pipe sections 330a and 330b, except the blind zones 361a, 361b. Since the blind zones 361a and 361b are smaller than the 360b and 360c, the inspection device 340 can inspect a relatively greater longitudinal length of the abutted pipe sections 330a and 330b than would be possible if the pipe sections 330a and 330b were inspected discretely. Meanwhile, a pipe section 330c is placed on the conveyor section 320a, behind the pipe section 330b, for transport at the first speed.

Figure 3E:
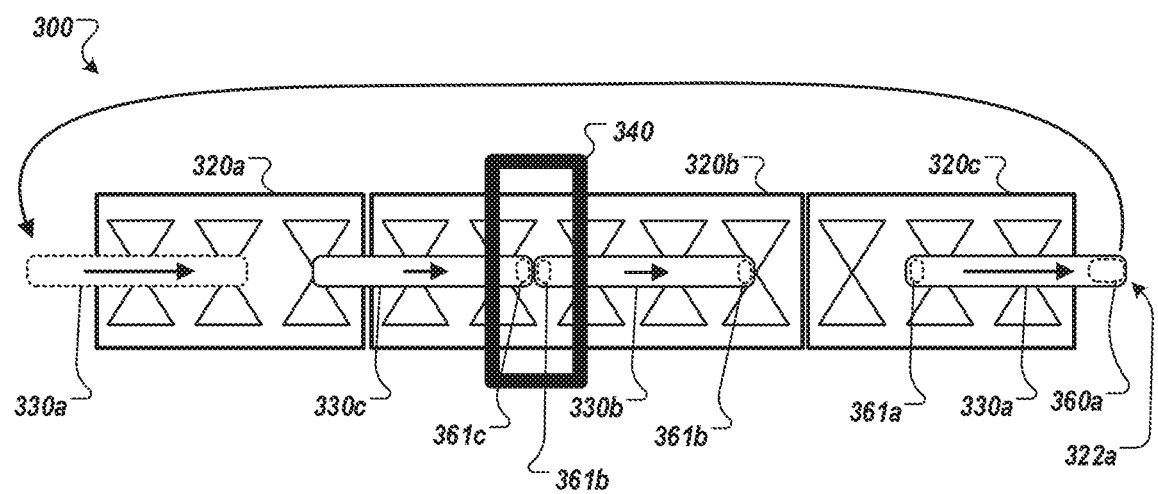

Referring now to FIG. 3E, the pipe section 330a has passed completely through the inspection device 340, and has reached a conveyor 320c. The conveyor section 320c includes one or more motors that can be controlled to control the speed at which pipe sections are transported. The conveyor section 320c is configured to transport pipe sections at a third speed that is relatively faster than the speed of the conveyor 320b. As such, the pipe section 330a is separated from being in abutment with the pipe section 330b.

Meanwhile, the pipe section 330c has come into abutment with the pipe section 330b. As such, the blind zone 360b shrinks to become a blind zone 361b, and the pipe section 330c includes a similarly reduced blind zone 361c.

Since the leading end 322a of pipe section 330a did not have the benefit of an abutting upstream pipe section, the blind zone 360a remained relatively large (e.g., >300 mm). To provide a more complete inspection of the pipe section 330a, the pipe section 330a can be returned to the conveyor 320a for reprocessing. In the illustrated example, the pipe section 330a will catch up to and abut the pipe section 330c, thus allowing the leading end 322a of the pipe section 330a to be inspected with a relatively smaller blind zone (e.g., down to about 3 mm from the leading end 322a).

In some implementations, other techniques can be used to reduce the lengths of blind zones. For example, the pipe section 330a may have threaded ends, and the leading end 322a may be temporarily mated with a short section of complementarily-threaded pipe that is configured to have a length and/or shape that allows the inspection device 340 to accurately inspect the leading end 322a with a reduced blind zone (e.g., long enough to let vibrations in the example sensor probe 41 of FIG. 2A to dampen out before the leading end 322a arrives at the location of the sensor probe 41). In another example, a "dummy" pipe section may be added before the first pipe section on the line (e.g., ahead of the leading end 322a) and/or behind the last pipe section on the line to provide abutment and therefore the tighter blind zones for the pipe sections against which the "dummy" sections abut. Such "dummy" pipe sections may then be reused at the starts and ends of subsequent inspection processes, rather than being passed along as finished product.

Figure 4:
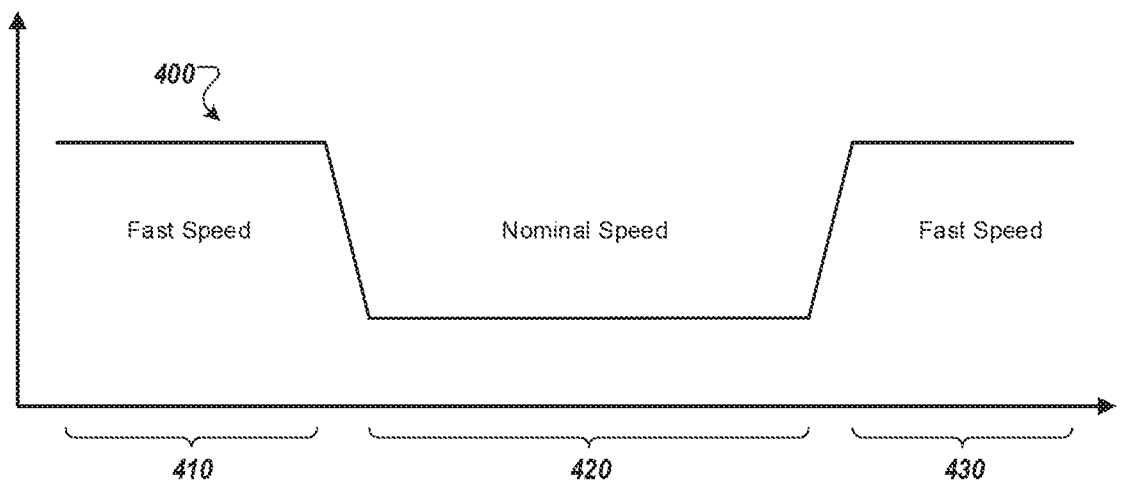
FIG. 4 shows a chart of an example speed profile of a pipe section in a pipe inspection system.

FIG. 4 shows a chart of an example speed profile 400 of a pipe section in a pipe inspection system. In some implementations, the speed profile 400 can represent the speeds at which the example pipe section 330a is transported through the example pipe inspection system 300 of FIGS. 3A-3E.

During a first phase 410, a pipe section is transported at a first (e.g., "fast") speed. For example, the pipe section 330a can be transported relatively quickly along the conveyor 320a. During a second phase 420, the pipe section is transported at a second (e.g., "nominal") speed. For example, the pipe section 330a can be transported at a nominal speed along the conveyor 320b at a speed that is slower than that provided by the conveyor 320a. During a third phase 430, the pipe section is transported at a third (e.g., "faster") speed. For example, the pipe section 330a can be transported away from the conveyor 320b by the conveyor 320c at a speed that is relatively faster than the nominal speed.

Figure 5A:
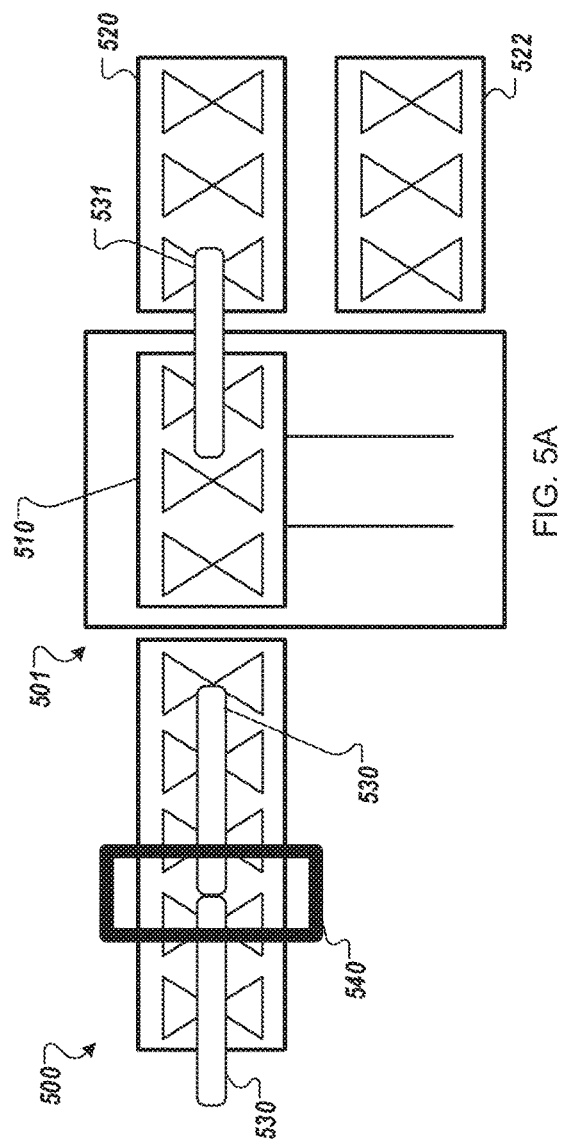
FIGS. 5A and 5B are block diagrams of an example pipe inspection system and post-inspection pipe segregation system.
Figure 5B:
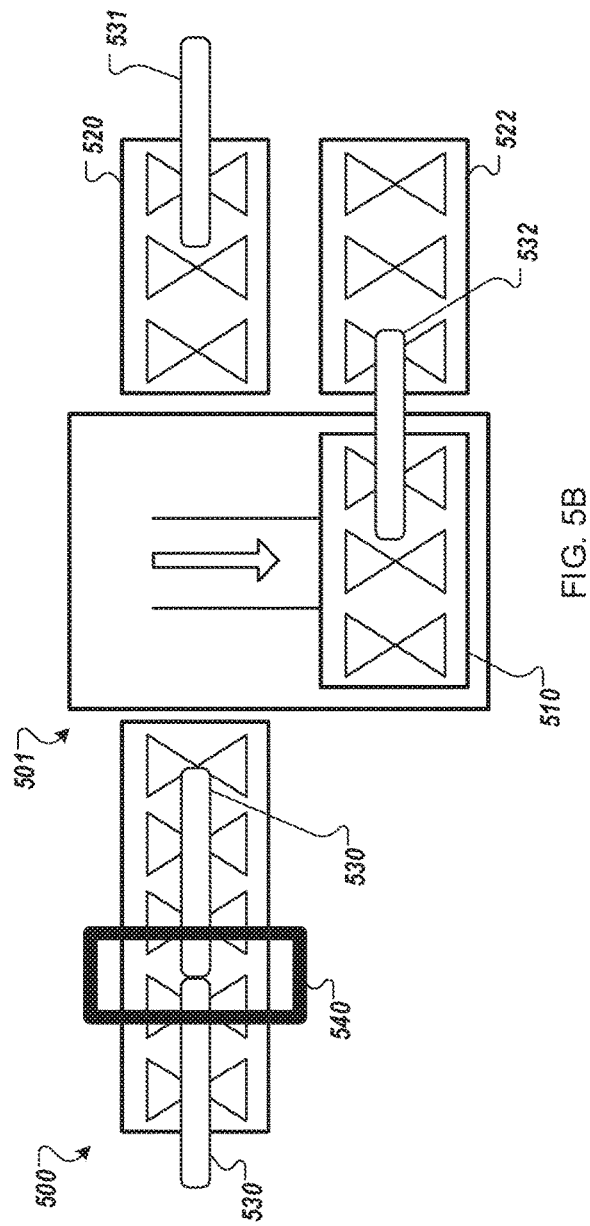

FIGS. 5A and 5B are block diagrams of an example pipe inspection system 500 and a post-inspection pipe segregation system 501. In some embodiments, the example pipe inspection system 500 can be part of the example pipe inspection systems 200 or 300 of FIGS. 2A-3E. In some embodiments, the post-inspection pipe segregation system 501 can be added downstream from the example pipe inspection systems 200 or 300.

In use, a collection of pipe sections 530 are abutted for inspection by an inspection device 540. As the pipe sections exit pipe inspection system 500, they are received by the post-inspection pipe segregation system 501. The post-inspection pipe segregation system 501 includes a conveyor section 510 that is moveable to direct inspected pipe section 530 to a first output conveyor 520 or a second output conveyor 522.

The post-inspection pipe segregation system 501 is configured to move the conveyor section 510 based, at least in part, on defect signals provided by the inspection device 540. For example, the inspection device 540 can perform an electromagnetic inspection as the abutted pipe sections 530 are conveyed relative to the inspection device, and provide defect data that describes defects detected along the pipe sections 530 including within reduced blind zone defined about abutments between the pipe sections 530. The defect data can be processed by a controller (e.g., the example controller 202 of FIG. 2A) to identify pipe sections that have defects, and send control signals downstream to the post-inspection pipe segregation system 501. In some embodiments, the post-inspection pipe segregation system 501 can include and/or be controlled by the example downstream controller 270 of FIG. 2A.

Referring to FIG. 5A, a pipe section 531 has been identified as having no defects detected by the inspection device 540, including no defects from about 300 mm to about 3 mm of the leading or trailing ends of the pipe section 531. As such, the post-inspection pipe segregation system 501 aligns the conveyor section 510 with the first output conveyor 520 (e.g., a "passed inspection" conveyor). In some embodiments, the first output conveyor 520 can transport the pipe section 531 for additional processing steps, such as subsequent inspection or processing steps toward a final product.

Referring now to FIG. 5B, a pipe section 532 has been identified as having at least one defect detected by the inspection device 540, including defects detected within about 300 mm to about 3 mm of the leading and/or trailing ends of the pipe section 532. As such, the post-inspection pipe segregation system 501 aligns the conveyor section 510 with the second output conveyor 522 (e.g., a "failed inspection" conveyor). In some embodiments, the second output conveyor 522 can transport the pipe section 531 for additional processing steps, such as segregating the pipe section from becoming a final product or directing the pipe section 532 for reprocessing, recycling, or disposal.

Figure 6:
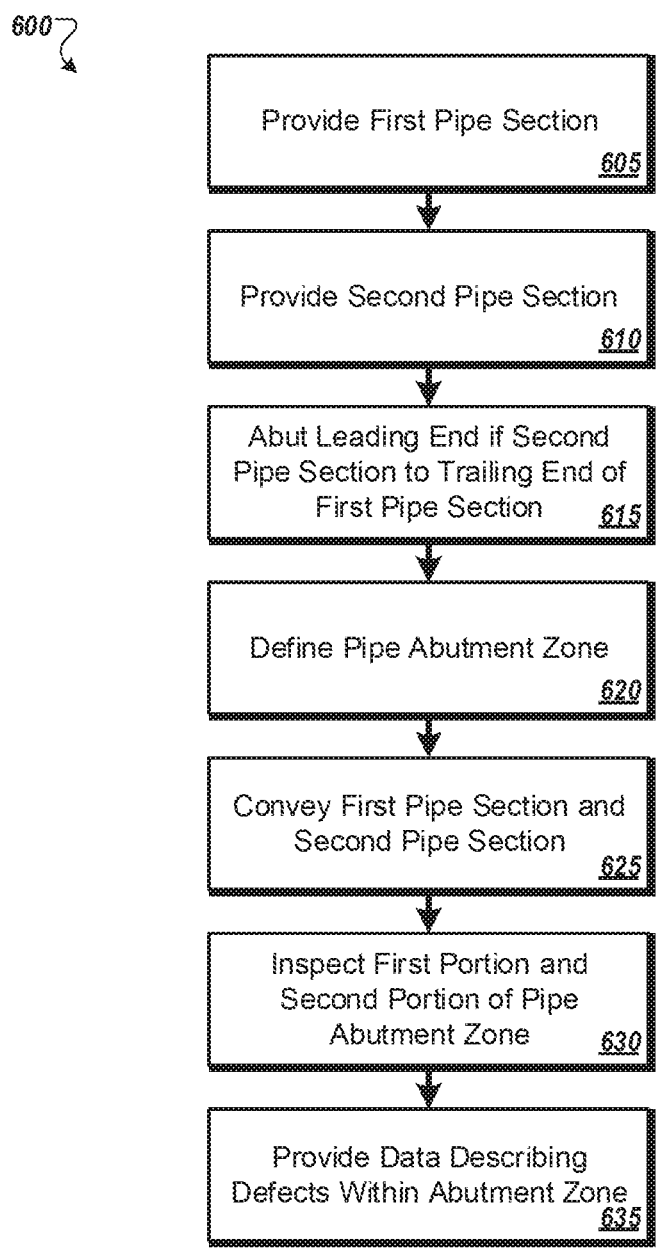
FIG. 6 is flow chart that shows an example of a process for inspecting pipe sections.

FIG. 6 is flow chart that shows an example of a process 600 for inspecting pipe sections. In some implementations, the process 600 may be performed by the example pipe inspection systems 200, 300, and/or 500 of FIGS. 2, 3A-3E, and 5A-5B.

At 605 a first pipe section having a first pipe body, a first leading end, and a first trailing end is provided. For example, the pipe section 230a can be placed on the conveyor 220a. In another example, the pipe section 330a can be placed on the conveyor 320a.

At 610, a second pipe section having a second pipe body, a second leading end, and a second trailing end is provided. For example, the pipe section 230b can be placed on the conveyor 220b. In another example, the pipe section 330b can be placed on the conveyor 320a behind the pipe section 330a.

At 615, the second leading end is abutted to the first trailing end to define a pipe abutment zone comprising a portion of the first pipe section measured longitudinally from the first trailing end a longitudinal distance of 300 mm and a portion of the second pipe section measured longitudinally from the second leading end a longitudinal distance of 300 mm. For example, in FIG. 3C the pipe section 330b catches up to an abuts the pipe section 330a such that there is a blind zone 361a and a blind zone 361b on the longitudinal sides of the abutment 336.

In some implementations, abutting the second leading end to the first trailing end to define a pipe abutment zone can include conveying the first pipe section longitudinally at the first speed, conveying the second pipe section longitudinally at a second speed that is faster than the first speed, contacting the second leading end to the first trailing end to define the pipe abutment zone, and conveying the first pipe section and the second pipe section longitudinally such that contact between the first trailing end and the second leading end is maintained. For example, the conveyor 320b operates at a slower speed than the conveyor 320a. As such the pipe section 330b will catch up to and contact the pipe section 330a, and the conveyor 320b will convey the abutted pipe sections 330a, 330b at the slower speed.

At 620 the first pipe section and the second pipe section are conveyed longitudinally at a first speed relative to an inspection device configured to perform an electromagnetic inspection. For example, the abutted pipe sections 330a and 330b are conveyed by the conveyor 320b through the inspection device 340 at a nominal speed (e.g., phase 420 of FIG. 4).

At 625, as the first pipe section and the second pipe section are conveyed relative to the inspection device, and at 630 the inspection device inspects a first portion of the pipe abutment zone and a second portion of the pipe abutment zone. In some implementations, inspecting the first portion of the abutment zone comprises inspecting a portion of the first pipe section measured longitudinally from the first trailing end a longitudinal distance of 3 mm to 300 mm and inspecting the second portion of the abutment zone comprises inspecting a portion of the second pipe section measured longitudinally from the second leading end a longitudinal distance of 3 mm to 300 mm. For example, the pipe inspection device 40 can inspect an axial section 250 as the pipe sections 230*a* and 230*b* pass through the inspection zone 52. Since the pipe sections 230*a* and 230*b* are in end-to-end contact, the pipe inspection device 40 can detect defects as close as 3 mm from each side of the abutment 236.

At 635 defect data that describes defects detected within at least one of the first portion and the second portion of pipe abutment zone providing, based on the inspecting by the inspection device. For example, the inspection device 40 can output defect sensor signals to the controller 202.

While the process 600 generally describes inspection near the ends of the pipe sections that are generally not available when inspecting individual pipe sections (e.g., inspecting pipes one at a time rather than in a pseudo-continuous manner as described herein), the process 600 is not limited to the inspection of the abutment zones only. In some implementations, the process 600 can also include inspecting the pipe body that extends between the pipe ends. For example, the process 600 can inspect the pipe body 261*a* of the example pipe section 230*a* of FIGS. 2A-2B along with the leading end 232*a* and the trailing end 234*a* as each passes by the pipe inspection device 40.

In some implementations, the method 600 can also include conveying, after inspecting the pipe abutment zone, the first pipe section longitudinally at a third speed that is faster than the second speed. For example, FIG. 3E shows that after the pipe section 330*a* has been inspected, the conveyor 320*c* can carry the pipe section 330*a* away at a speed that is faster than that of the conveyor 320*b*.

In some implementations, the process 600 can also include providing a third pipe section having a third pipe body, a third leading end, and a third trailing end, abutting the third leading end to the second trailing end to define a second pipe abutment zone comprising a portion of the second pipe section measured longitudinally from the second trailing end a longitudinal distance of 300 mm and a portion of the third pipe section measured longitudinally from the third leading end a longitudinal distance of 300 mm, conveying the second pipe section and the third pipe section longitudinally at the first speed relative to the inspection device, inspecting, by the inspection device as the second pipe section and the third pipe section are conveyed relative to the inspection device, the second abutment zone, and providing, based on the inspecting, defect data that describes defects detected within the second pipe abutment zone by the inspection device. For example, the pipe section 330*c* can be brought into end-to-end contact with the pipe section 330*b* for inspection by the inspection device 340.

In some implementations, the process 600 can also include inspecting, by the inspection device as the first pipe section is conveyed relative to the inspection device, a portion of the first pipe body, and inspecting, by the inspection device as the second pipe section is conveyed relative to the inspection device, a portion of the second pipe body. For example, the inspection device 40 can inspect the pipe sections 230*a* and 230*b*, including portions of the pipe bodies 261*a* and 261*b*. With reference to FIG. 3C, the inspection can be made within regions of the blind zones 360*b* and 360*c* that exclude the reduced blind zones 361*a* and 361*b*.

In some implementations, the inspection can include creating a magnetic field proximal an axial pipe section, detecting an interaction of the magnetic field with the axial pipe section, and detecting a variance of the interaction at the axial pipe section. For example, the inspection devices 40, 340, and/or 540 can function using the principle of dispersed electromagnetic flow.

In some implementations, the process 600 can include determining that the variance exceeds a predetermined defect threshold value, identifying one of the first pipe section or the second pipe section as having the axial pipe section that caused the variance as a defective pipe section, and segregating the defective pipe section from other pipe sections not identified as defective pipe sections wherein the axial pipe section is less than 300 mm away from the first trailing end or the second leading end. For example, the controller 202 can be configured (e.g., calibrated) with a threshold value that represents a minimum sensor variance that can indicate the presence of a defect sensed by the inspection device 40. If the sensor signals received from the inspection device vary by, or exceed, the threshold value, then the controller 202 can identify the pipe section in which the defect was detected and trigger the post-inspection pipe segregation system 501 to direct the defective pipe section away from the output conveyor 520 and toward the output conveyor 521.

In some implementations, the process 600 can include determining that the variance exceeds a predetermined defect threshold value, receiving position information of at least one of the first pipe section and the second pipe section, identifying one of the first pipe section or the second pipe section as having the axial pipe section that caused the variance as a defective pipe section, and identifying, based on the position information, the position of the axial pipe section along the defective pipe section, providing defect information that identifies the defective pipe section and the identified position of the axial pipe section where the variance exceeded the defect threshold value, wherein the identified position is in the pipe abutment zone of the first pipe section and the second pipe section. For example, the controller 202 can be configured (e.g., calibrated) with a threshold value that represents a minimum sensor variance that can indicate the presence of a defect sensed by the inspection device 40. If the sensor signals received from the inspection device vary by, or exceed, the threshold value, then the controller 202 can identify the pipe section in which the defect was detected and identify the location of the defect along the length of the pipe section in which the defect was detected. In some implementations, if the defect is located within a predetermined distance from the end of a pipe section, the pipe section may be reworked to remove the defect. For example, if a 10 m long pipe section has a defect 15 cm from the end, the end may simply be cut of about 25 cm from the end, resulting in a 9.75 m pipe section without the defect.

In some implementations, the process 600 can include receiving position information of the first pipe section and the second pipe section, determining that the variance exceeds a predetermined abutment threshold value, identifying, based on the position information, the position of the axial pipe section where the variance exceeded the abutment threshold value, providing the identified position as first position information representative of a location of the first trailing end, and providing the identified position as second position information representative of a location of the second leading end.

For example, the abutment 236, when encountered by the probe 41, may cause a variance in the sensor signals output by the pipe inspection device 40. This variance can be larger than that of any expected pipe defect. The controller 202 can be configured (e.g., calibrated) with a threshold value that can be used to distinguish between defects and abutments. For example, axial sections having no defects may cause sensor signals to have little variance about a predetermined nominal value, while defects can cause variances that exceed a defect threshold but do not exceed an abutment threshold value, and abutment can cause variances that exceed both the defect threshold value and the abutment threshold value.

The controller 202 can determine that an abutment has been detected, and based on position signals from the pipe location devices 222a and/or 222b, identify the location of the detected abutment. Since the abutment (e.g., the abutment 236) is defined by the point where a pipe section trailing end (e.g., the trailing end 234a) contacts a subsequent pipe section's leading end (e.g., the leading end 232b), the locations of the trailing end and the leading end can also be determined and provided to other controllers (e.g., the downstream controller 270) to coordinate other operations.

In some implementations, the process 600 can also include receiving, by a controller, at least one of the first position information and the second position information, and controlling, by the controller and after inspecting the pipe abutment zone, a process based at least one of the first position information and the second position information. In some implementations, the process can be one of a motion control process, a longitudinal electromagnetic longitudinal defect inspection process, an ultrasonic pipe thickness inspection process, a transversal defect inspection process, or a machine vision based inspection process. For example, the controller 202 can process sensor signal information from the pipe inspection device 40 and process position feedback signals from the pipe location devices 222a, 222b, and provide the downstream control signal 265 to the downstream controller 270, which may be configured to control the post-inspection pipe segregation system 501. In another example, the downstream controller 270 can be configured to control other longitudinal electromagnetic longitudinal defect inspection processes, pipe thickness inspection processes (e.g., ultrasonic), machine vision-based inspection processes, automation processes, or any other appropriate process for manufacturing or inspecting pipe sections.

Figure 7:
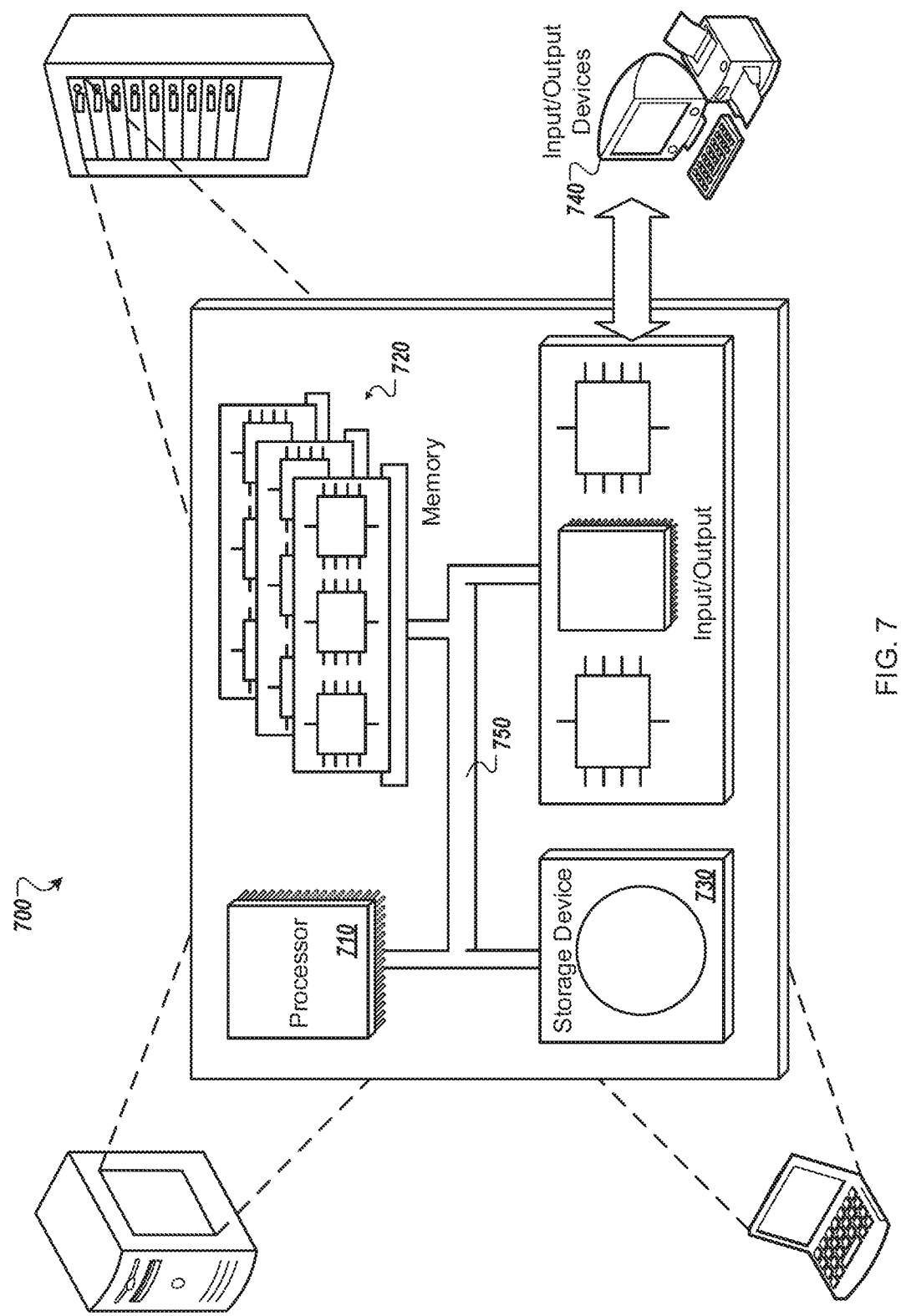
FIG. 7 is a schematic diagram of an example of a generic computer system.

FIG. 7 is a schematic diagram of an example of a generic computer system 700. The system 700 can be used for the operations described in association with the method 300 according to one implementation. For example, the system 700 may be included in either or all of the controller 202, the downstream controller 270, the pipe inspection devices 40, 340, and 540, the pipe location devices 222a and 222b, and the post-inspection pipe segregation system 501.

The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method of pipe inspection, comprising:
providing a first pipe section having a first pipe body, a first leading end, and a first trailing end;
providing a second pipe section having a second pipe body, a second leading end, and a second trailing end;
abutting at least a portion of the second leading end to at least a portion of the first trailing end to define a pipe abutment zone comprising a portion of the first pipe section measured longitudinally from the first trailing end a longitudinal distance of 300 mm and a portion of the second pipe section measured longitudinally from the second leading end a longitudinal distance of 300 mm;
conveying the first pipe section and the second pipe section longitudinally at a first speed relative to an inspection device configured to perform an electromagnetic inspection;
inspecting, by the inspection device as the first pipe section and the second pipe section are conveyed relative to the inspection device, a first portion of the pipe abutment zone and a second portion of the pipe abutment zone; and
providing, based on the inspecting, defect data that describes defects detected within at least one of the first portion and the second portion of the pipe abutment zone by the inspection device.

2. The method of claim 1, wherein abutting the second leading end to the first trailing end to define a pipe abutment zone comprises:
conveying the first pipe section longitudinally at the first speed;
conveying the second pipe section longitudinally at a second speed that is faster than the first speed;
contacting the second leading end to the first trailing end to define the pipe abutment zone; and
conveying the first pipe section and the second pipe section longitudinally such that contact between the first trailing end and the second leading end is maintained.

3. The method of claim 2, further comprising conveying, after inspecting the pipe abutment zone, the first pipe section longitudinally at a third speed that is faster than the second speed.

4. The method of claim 3, further comprising:
providing a third pipe section having a third pipe body, a third leading end, and a third trailing end;
abutting at least a portion the third leading end to at least a portion of the second trailing end to define a second pipe abutment zone comprising a portion of the second pipe section measured longitudinally from the second trailing end a longitudinal distance of 300 mm and a portion of the third pipe section measured longitudinally from the third leading end a longitudinal distance of 300 mm;
conveying the second pipe section and the third pipe section longitudinally at the first speed relative to the inspection device;
inspecting, by the inspection device as the second pipe section and the third pipe section are conveyed relative to the inspection device, the second pipe abutment zone; and
providing, based on the inspecting, defect data that describes defects detected within the second pipe abutment zone by the inspection device.

5. The method of claim 1, further comprising:
inspecting, by the inspection device as the first pipe section is conveyed relative to the inspection device, a portion of the first pipe body; and
inspecting, by the inspection device as the second pipe section is conveyed relative to the inspection device, a portion of the second pipe body.

6. The method of claim 1, wherein the inspection comprises:
creating a magnetic field proximal an axial pipe section;
detecting an interaction of the magnetic field with the axial pipe section; and
detecting a variance of the interaction at the axial pipe section.

7. The method of claim 6, further comprising:
determining that the variance exceeds a predetermined defect threshold value;
identifying one of the first pipe section or the second pipe section as having the axial pipe section that caused the variance as a defective pipe section; and
segregating the defective pipe section from other pipe sections not identified as defective pipe sections; and
wherein the axial pipe section is less than 300 mm away from the first trailing end or the second leading end.

8. The method of claim 6, further comprising:
determining that the variance exceeds a predetermined defect threshold value;
receiving position information of at least one of the first pipe section and the second pipe section;
identifying one of the first pipe section or the second pipe section as having the axial pipe section that caused the variance as a defective pipe section; and
identifying, based on the position information, an identified position of the axial pipe section along the defective pipe section; and
providing defect information that identifies the defective pipe section and the identified position of the axial pipe section where the variance exceeded the predetermined defect threshold value, wherein the identified position is in the pipe abutment zone of the first pipe section and the second pipe section.

9. The method of claim 6, further comprising:
receiving position information of the first pipe section and the second pipe section;
determining that the variance exceeds a predetermined abutment threshold value;

identifying, based on the position information, an identified position of the axial pipe section where the variance exceeded the predetermined abutment threshold value;
providing the identified position as first position information representative of a location of the first trailing end; and
providing the identified position as second position information representative of a location of the second leading end.

10. The method of claim 9, further comprising:
receiving, by a controller, at least one of the first position information and the second position information; and
controlling, by the controller and after inspecting the pipe abutment zone, a process based at least one of the first position information and the second position information.

11. The method of claim 10, wherein the process is one of a motion control process, a longitudinal electromagnetic longitudinal defect inspection process, an ultrasonic pipe thickness inspection process, a transversal defect inspection process, or a machine vision based inspection process.

12. The method of claim 1 wherein inspecting the first portion of the pipe abutment zone comprises inspecting a portion of the first pipe section measured longitudinally from the first trailing end a longitudinal distance of 3 mm to 300 mm and inspecting the second portion of the abutment zone comprises inspecting a portion of the second pipe section measured longitudinally from the second leading end a longitudinal distance of 3 mm to 300 mm.

13. A computer program stored in a computer readable storage device, the computer program comprising instructions that when executed by a computer system cause the user device to perform electromagnetic inspection operations on a first pipe section having a first pipe body, a first leading end, and a first trailing end and a second pipe section in at least partial abutment with a second pipe body having, a second leading end, and a second trailing end, said inspection operations comprising:
receiving pipe defect signals from an electromagnetic pipe inspection device;
receiving pipe position signals from a pipe position location device;
detecting a pipe defect location in an abutment zone comprising a portion of the first pipe section measured longitudinally from the first trailing end a longitudinal distance of 300 mm and a portion of the second pipe section measured longitudinally from the second leading end a longitudinal distance of 300 mm, based on the received pipe defect signals, received pipe position signals, and a predetermined pipe defect threshold value;
identifying a defective pipe section based on the pipe defect location; and
providing an identity of the defective pipe section.

14. The computer program of claim 13, the operations further comprising:
detecting a pipe abutment location based on received pipe defect signals, received pipe position signals, and a predetermined pipe abutment threshold value that is different from the predetermined pipe defect threshold value; and
providing a pipe end position signal based on the pipe abutment location, representative of a location of an abutment between a pipe section leading end and a pipe section trailing end.

15. The computer program of claim 13, the operations further comprising:
providing a conveyor control signal that causes a first section of pipe conveyor to operate at a first speed; and
providing a conveyor signal that causes a second section of pipe conveyor, operationally downstream from the first section of pipe conveyor, to operate at a second speed that is slower than the first speed, wherein the pipe inspection device is arranged along the second section of pipe conveyor.

16. The computer program of claim 15, the operations further comprising:
determining, based on pipe position signals, that a first pipe section on the first section of pipe conveyor has abutted a second pipe section on the second section of pipe conveyor; and
providing a second conveyor control signal that causes the first section of pipe conveyor to operate at approximately the second speed.

17. The computer program of claim 13, wherein detecting a pipe defect location based on received pipe defect signals, received pipe position signals, and the predetermined defect threshold value further comprises:
receiving position information of at least one of a first pipe section having a trailing end and a second pipe section having a leading end longitudinally abutting the trailing end; and
determining that a variance in the pipe defect signals exceeds the predetermined pipe defect threshold value, wherein the variance is detected less than 300 mm away from the first trailing end or the second leading end; and
wherein identifying a defective pipe section based on the pipe defect location further comprises identifying one of the first pipe section or the second pipe section as having caused the variance.

18. The computer program of claim 13, wherein detecting a pipe abutment location further comprises:
receiving position information of at least one of a first pipe section having a trailing end and a second pipe section having a leading end longitudinally at least partially abutting the trailing end;
determining that a variance in the pipe defect signals exceeds a predetermined pipe abutment threshold value, wherein the variance is detected less than about 3 mm away from the first trailing end or the second leading end; and
identifying, based on the position information, an identifying position where the variance exceeded the predetermined abutment threshold value; and
wherein providing the pipe end position signal further comprises providing the identified position as a pipe end position.

19. A system for pipe inspection, comprising:
an electromagnetic pipe inspection device;
a pipe position location device; and
a controller comprising:
a defect signal input port configured to receive pipe defect signals from the pipe inspection device;
a position input port configured to receive pipe position signals from the pipe position location device; and
a processor configured to:
detect a pipe defect location based on pipe defect signals, pipe position signals, and a predetermined pipe defect threshold value, and provide the pipe defect location as a pipe defect location signal at a first output port, wherein the pipe defect location signal identifies pipe sections having pipe defects, wherein the pipe defect location is within an abutment zone comprising a portion of a first pipe section measured longitudinally from a first trailing end a longitudinal distance of 300 mm, and a second pipe section measured longitudinally from a second leading end, at least partially abutted to the first trailing end, a longitudinal distance of 300 mm.

20. The system of claim 19, wherein the processor is further configured to:

detect a pipe abutment location based on pipe defect signals, pipe position signals, and a predetermined pipe abutment threshold, and provide a pipe end position signal at a second output port, wherein the pipe end position signal identifies a location of at least one of a pipe section leading end and a pipe section trailing end.

21. The system of claim 19, further comprising a conveyor configured to convey pipe sections longitudinally, the conveyor comprising first motor configured to convey pipe sections along an upstream section of the conveyor a first speed, and a second motor configured to convey pipe sections along a downstream section of the conveyor at a second speed that is slower than the first speed.

22. The system of claim 21, wherein at least one of the first motor and the second motor are configured to convey pipe sections based on a speed signal received from a motor control output port of the controller, and wherein the processor is further configured to provide the speed signal such that the second speed is less than the first speed.

23. The system of claim 22, wherein the conveyor further comprises a third motor configured to convey pipe sections along an output section of the conveyor at a third speed that is faster than the second speed.

\* \* \* \* \*

UNITED STATES PATENT AND TRADEMARK OFFICE
CERTIFICATE OF CORRECTION

| | |
|---|---|
| PATENT NO. | : 10,989,693 B2 |
| APPLICATION NO. | : 16/646553 |
| DATED | : April 27, 2021 |
| INVENTOR(S) | : Alberto Nicolini, Javier Etcheverry and Fernando Núñez |

It is certified that error appears in the above-identified patent and that said Letters Patent is hereby corrected as shown below:

In the Specification

In Column 1, Line 5, after "application" insert -- is a U.S. National Application under 35 U.S.C. § 371 and claims the benefit of priority to International Application Serial No. PCT/EP2018/074456, filed September 11, 2018, which --

In Column 7, Line 66, please delete "230*bb*" and insert -- 230*b* --

In Column 15, Line 40, please delete "vision-based" and insert -- vision based --

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*